United States Patent [19]

Bush

[11] Patent Number: 5,740,742
[45] Date of Patent: Apr. 21, 1998

[54] ROAD/RAIL TRUCK TRACTOR

[76] Inventor: David E. Bush, Rte. 1 Box 77, Gary, Tex. 75643

[21] Appl. No.: 803,005

[22] Filed: Feb. 21, 1997

[51] Int. Cl.$^6$ .................................................. B61C 11/00
[52] U.S. Cl. .................................... 105/72.2; 280/441.2
[58] Field of Search ..................... 105/72.2; 280/441.2, 280/417.1, 418.1, 416.1

[56] References Cited

U.S. PATENT DOCUMENTS

| | | | |
|---|---|---|---|
| 3,940,167 | 2/1976 | Pilz | 105/72.2 |
| 5,016,544 | 5/1991 | Woollam | 105/215.2 |
| 5,040,815 | 8/1991 | Evans | 280/441.2 |
| 5,103,740 | 4/1992 | Masse | 105/72.2 |
| 5,332,248 | 7/1994 | Higginbotham | 280/441.2 |
| 5,619,931 | 4/1997 | Madison | 105/72.2 |

FOREIGN PATENT DOCUMENTS 515294  11/1992  European Pat. Off. ............ 280/441.2

Primary Examiner—Mark Tuan Le

[57] ABSTRACT

A truck tractor adapted for use on railways to tow one or more railcars while retaining the capability to tow highway trailers. A beam assembly with a railcar hitch on the back and a hitch pin underneath the front is latched to the hitch coupler of the truck tractor when used to tow railcars. The beam assembly rests on the rear of the truck tractor frame. A set of hydraulically retractable railway wheels is used to guide the rear drive wheels while on the rails. The front of the truck tractor is equipped with a set of retractable railway wheels which are used to lift the front steering axle of the truck tractor clear of the railroad rails and to raise and lower the railcar hitch for transfer of weight of the first railcar being towed to the drive wheels of the truck tractor. To resume highway operations the rail wheels are retracted and the beam assembly is unlatched from the hitch coupler and removed from the truck tractor.

8 Claims, 3 Drawing Sheets

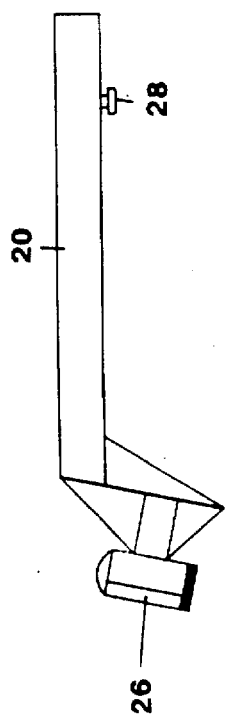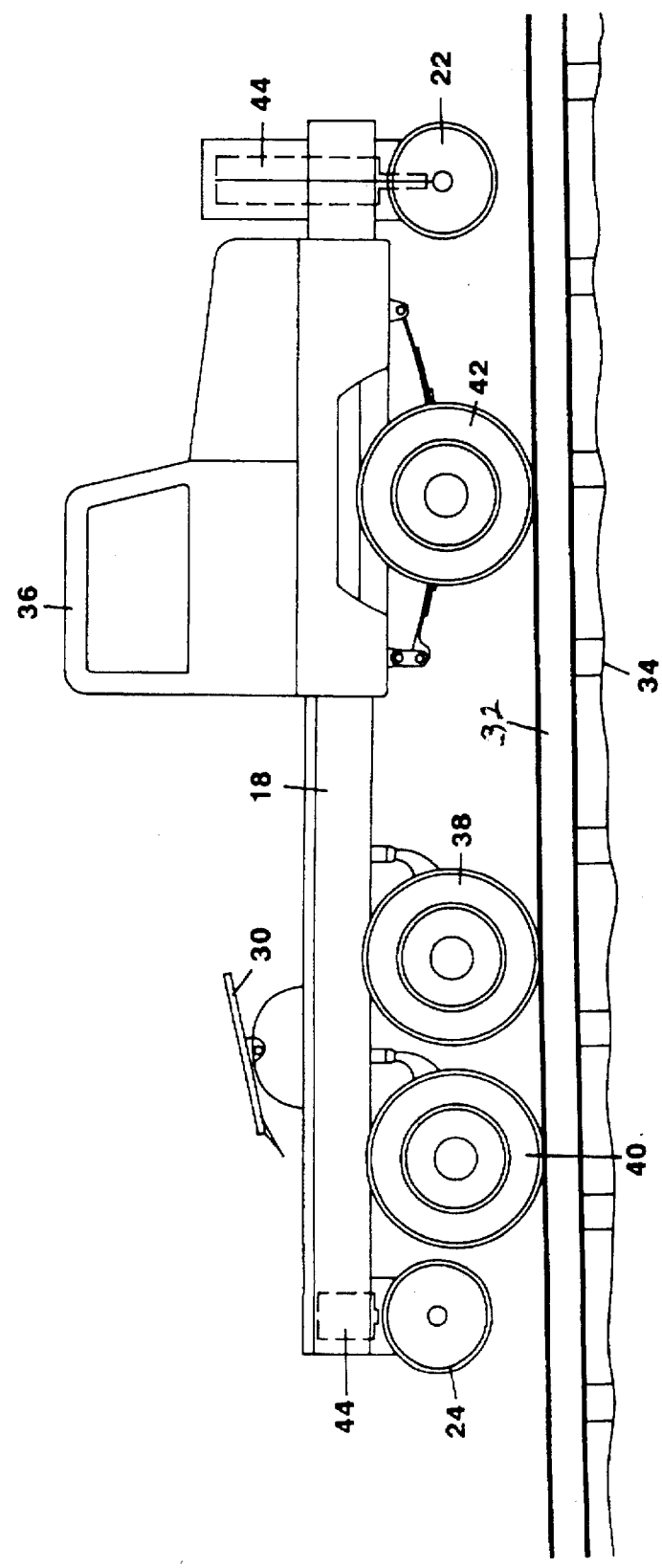

ROAD/RAIL TRUCK TRACTOR

BACKGROUND OF THE INVENTION

1. Field of the Invention

This invention relates to a power unit commonly known as a truck tractor for moving truck trailers along highways. The truck being equipped with retractable rail guide wheels front and rear and a removeable railcar hitch on the rear for towing railcars.

Normally, railroad components such as crossties, rail plates, spikes, etc., used to maintain or upgrade railroads, are transported to a nearby siding in gondola type railcars by regular freight train service. When ready for distribution, a material-handling device such as a backhoe loader or hydraulic excavator equipped with a grapple, magnet or bucket is loaded onto the railcars, a locomotive or a switch engine is then brought in to tow the railcars to the jobsite for unloading of the railroad components.

An object of the present invention is to provide a truck tractor with a hitch coupler and trailer for transporting a material handler to a rail siding where the trailer is unlatched from the truck tractor. The material handler is then used to attach the railcar hitch, which is transported on the trailer, to the truck tractor hitch coupler. The material handler is then loaded onto the railcars, which are loaded with railroad components for distribution. The truck tractor is driven onto the rails at a nearby grade crossing. The inside dual wheels of the front and rear drive axles of the truck tractor are centered on the railroad rails. The retractable rear rail guide wheels, when lowered hydraulically into operating position, take only enough of the truck tractor weight to provide adequate guidance. The front rail guide wheels are extended hydraulically downwardly lifting the truck tractor front steering axle tires well above the rails. The truck tractor is then backed down the rails and coupled to the first railcar to be towed. The front rail guide wheels are then partially retracted to lower the front of the truck tractor, which raises the railcar hitch on the rear.

The railcar hitch mounted on the truck tractor is designed with a solid steel bottom which engages underneath the railcar hitch of the first railcar to be towed. The lifting action created by lowering the front of the truck transfers a portion of the weight of the railcar to the truck tractor drive axles to provide adequate traction to tow one or more railcars. The truck tractor is then used to tow the railcars and material handler to the jobsite where the railroad components are distributed.

2. Description of the Prior Art

The prior art includes various means of transporting highway vehicles on railroads for moving materials, equipment and personnel to remote locations along the rail. Also, various equipment is used to tow railcars where a full size locomotive is not required. Applicant is not presently aware of any truck tractor suitable to pull common highway trailers with the ability to tow railcars.

U.S. Pat. No. 5,016,544 date May 21, 1991 issued to Wollam, discloses a road/rail power unit for towing railcars in revenue service. The apparatus would be prohibitively expensive to manufacture and would not be practical for highway revenue service because of the weight and length of the power unit.

U.S. Pat. No. 5,103,740 dated Apr. 14, 1992 issued to Masse, discloses a vehicle for road and rail operation with air suspension. While this vehicle provides better traction on rails in wet conditions, it is not practical for highway revenue service because of weight and length of the vehicle.

It is an object of the present invention to provide an economical method and power unit to tow one or more railcars for the distribution of railroad components on a mainline or for yard switching of railcars:

(a) by utilizing a conventional truck tractor with a hitch coupler which can be used for highway truck trailer service.

(b) using a detachable railcar hitch which connects to the truck tractor hitch coupler.

(c) utilizing the front rail guide wheels to raise and lower the railcar hitch for transfer of weight from the first railcar being towed to truck tractor drive wheels.

Other objects and advantages will become apparent from consideration of the following description and drawings.

BRIEF DESCRIPTION OF THE DRAWINGS

FIG. 1 is a side elevational view illustrating the truck tractor with the front and rear rail guide wheels in the highway travel position;

FIG. 2 is a side elevational view showing the removeable beam structure with a railcar hitch and hitch pin;

DESCRIPTION OF THE PREFERRED EMBODIMENTS

Figure 3:
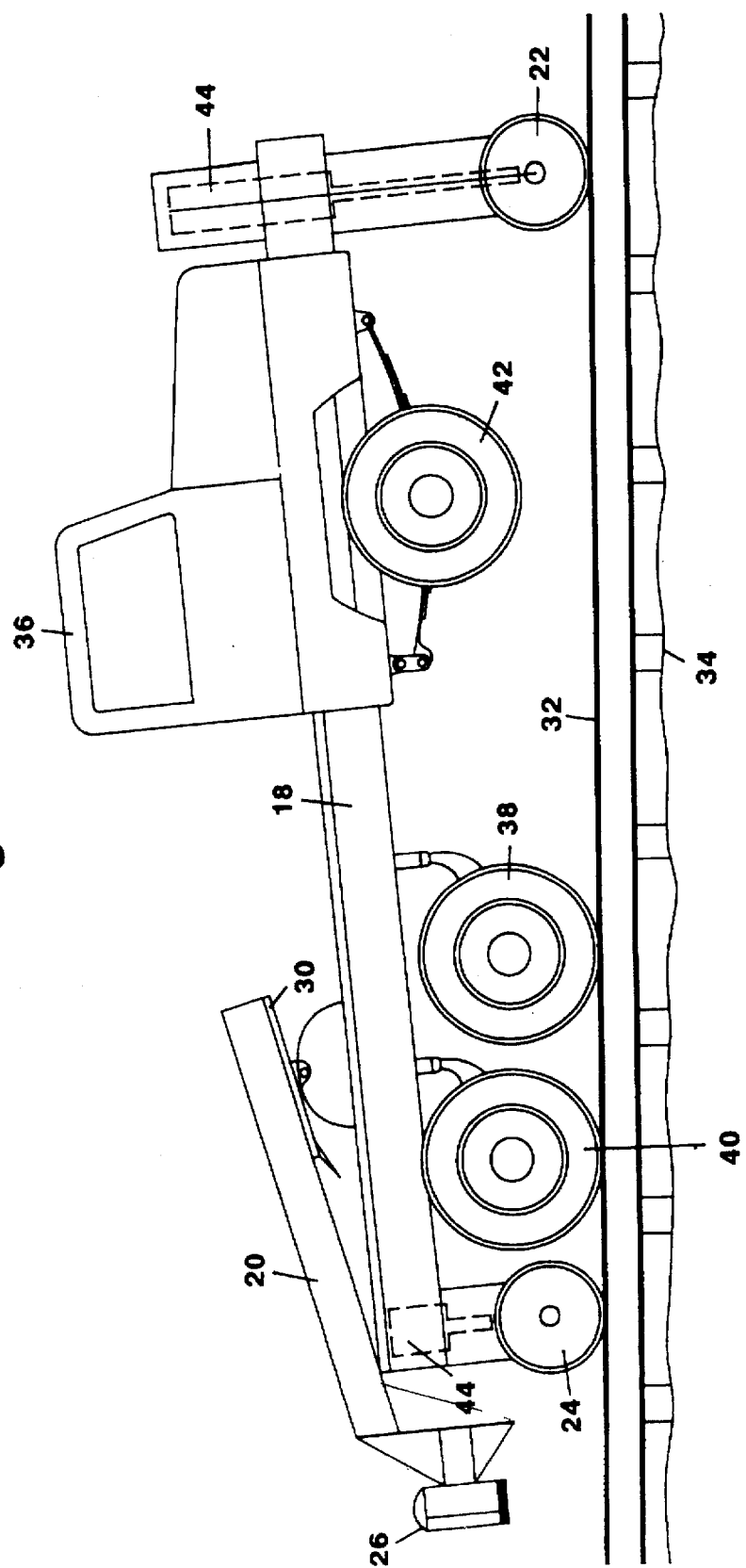
FIG. 3 is a side elevational view of the truck tractor illustrating the front rail guide wheels fully extended the removeable beam structure mounted on the truck tractor and the railcar hitch lowered to connect to the first railcar to be towed.

Referring now to the drawings, the reference numeral 36 indicates the power unit used to tow highway trailers (not shown) or one or more railcars (not shown). The power unit being commonly referred to as a truck tractor (36) which is of the type commonly used to pull trailers on highways. The truck tractor (36) shown in the drawings has tandem rear drive axles with dual wheels on each of the two rear drive axles. When centered on a standard North American gauge railroad the inside dual tires on the front and rear drive axles (38 and 40) center on the rail (32) for tractive force to drive the truck tractor (36) along the rails (32).

As illustrated in FIG. 2 apparatus of the invention is a beam structure and is referred to by numeral 20. In general, the beam structure (20) is used to connect a railcar (not shown) to the hitch coupler (30) of the truck tractor (36) and to transfer weight from the first railcar being towed to the front and rear drive axles (38 and 40) by raising and lowering the front of the truck tractor (36) using the front rail guide wheels (22).

In FIG. 1 the truck tractor (36) is shown with the beam structure (20) removed and the front and rear rail guide wheels (22) and (24) in the highway travel position where they do not interfere with normal truck trailer operations.

FIG. 2 illustrates the beam structure (20) with a hitch pin (28) and a railcar hitch (26). The beam structure hitch pin (28) is designed to latch into the truck tractor hitch coupler (30), typically located in the center of the truck frame (18) as shown is FIG. 1, just as a truck trailer (not shown) would conventionally connect to the truck tractor (36).

The railcar hitch (26) is equipped with a solid metal bottom which slides underneath the hitch of the first railcar being towed to allow weight transfer from the first railcar being towed to the truck tractor front and rear drive axles (38 and 40). The beam structure (20) is built to be easily removed by unlatching the truck tractor hitch coupler (30) as would be conventionally done to unlatch a truck trailer (not shown). The rear portion of the beam structure (20) rests on the extreme rear end of the truck frame (18) when installed to tow railcars, as illustrated in FIG. 3.

In FIG. 3 the truck tractor (36) is shown with the beam structure (20) in place for towing railcars. The rear rail guide wheels (24), the front rail guide wheels (22) and the inside tires of the front and rear drive axles (38 and 40), are in contact with the railroad, rails (32) which rest upon crossties (34). The front rail guide wheels (22) are raised and lowered by hydraulic cylinders (44). The hydraulic cylinders (44) are powered by an electric hydraulic pump (not shown) powered by the electrical system not illustrated of the truck tractor (36).

The front rail guide wheels (22) are shown in FIG. 3 fully extended by means of the hydraulic cylinder (44). With the front rail guide wheels (22) fully extended, the railcar hitch (26) is lowered into position to connect to the first railcar (not illustrated) to be towed. The truck tractor (36) is then backed down the rail (32) and connected to one or more railcars.

Figure 4:
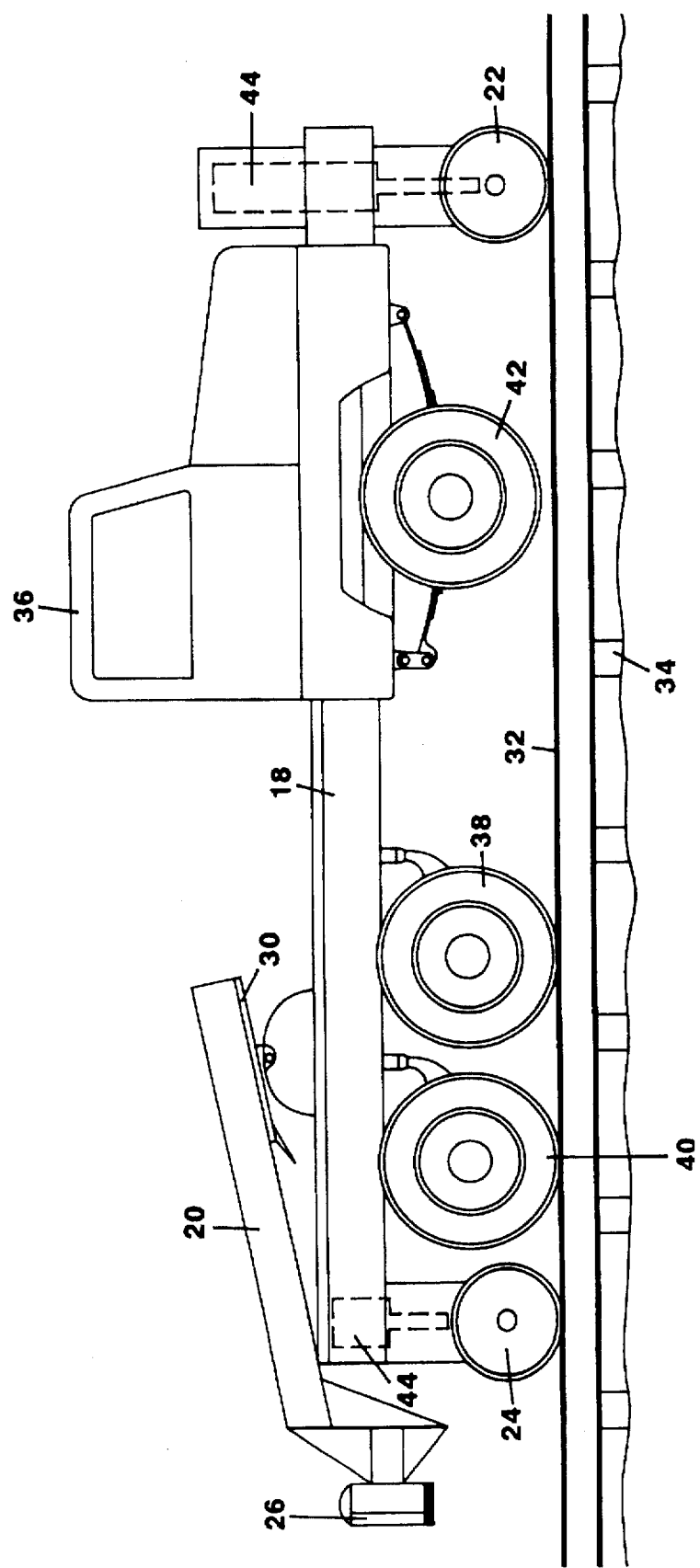
FIG. 4 is a side elevational view of the truck tractor and the removable beam structure in the rail travel position.

After the connection to a railcar is made, the front rail guide wheels (22) are partially retracted, which raises the railcar, thus hitch (26) and the first railcar transferring a portion of the weight of the first railcar onto the truck tractor (36) front and rear drive axles (38 and 40) to increase tractive effort. The steering axle (42) remains high enough to clear the railroad rails (32) as shown in FIG. 4.

The rear rail guide wheels (24) are raised and lowered by a second hydraulic cylinder (44) which is powered by an electric hydraulic pump (not shown) powered by the electric system of the truck tractor (36), and are designed to carry just enough weight to provide adequate guidance of the front and rear drive axles (38 and 40). As the need for tractive effort decreases when desired speed is reached, the front rail guide wheels (22) can be extended to lessen the weight carried by the front and rear drive axles (38 and 40), thus prolonging the life of the tires.

Accordingly it will be appreciated that the apparatus of the invention is a highly productive, versatile and economical apparatus for transporting freight on roadway or railways using the same truck tractor power unit.

While my above description contains many specifications, these should not be construed as limitations on the scope of the embodiment thereof. Many other variations are possible. For example, the truck tractor 36 could include:

(a) A Hydraulic crane mounted behind the cab.

(b) A front railcar hitch.

(c) A water pump for vegetation control along the rails.

Also, the truck tractor could be used to retrieve used railroad components. Accordingly, the scope of the invention should not be limited by the embodiments illustrated, but the appended claims and their legal equivalents.

I claim:

1. A truck tractor vehicle for operation on roadways and railways and for attaching to a railcar, comprising:

(a) a vehicle frame including a hitch coupler capable of towing highway trailers;

(b) front and rear drive axles mounted to said vehicle frame for driving the vehicle on roadways and railways;

(c) front and rear pairs of retractable rail guide wheels mounted on opposite ends of said vehicle frame to locate the vehicle on a railway when said retractable rail guide wheels are extended for rail use; and (d) a railcar hitch beam structure having one end mounted on said hitch coupler and the opposite end of said railcar hitch beam structure for engaging the railcar for towing the railcar.

2. The truck tractor vehicle of claim 1 comprising a railcar hitch provided on said opposite end of said railcar hitch beam structure for removably engaging the railcar.

3. The truck tractor vehicle of claim 1 comprising a hitch pin provided on said one end of said railcar hitch beam structure for removably attaching said railcar hitch beam structure to said hitch coupler of said truck tractor.

4. The truck tractor of claim 1 comprising:

(a) a railcar hitch provided on said opposite end of said railcar hitch beam structure for removably engaging the railcar; and (b) a hitch pin provided on said one end of said railcar hitch beam structure for removably attaching said railcar hitch beam structure to said hitch coupler of said truck tractor.

5. A truck tractor vehicle for selectively traveling on roads and rails and for attaching to railcars for towing the railcars on the rails, comprising:

(a) a hitch coupler provided on the truck tractor vehicle;

(b) a railcar hitch beam structure having one end mounted on said hitch coupler on said truck tractor vehicle and the opposite end of said railcar hitch beam structure for connecting the railcar for towing the railcar on the rails responsive to operation of said truck tractor vehicle; and (c) front and rear retractable rail guide means provided on opposite ends of said truck tractor vehicle for selectively raising and lowering said ends of said truck tractor vehicle and for coupling said opposite end of said railcar hitch beam structure to the railcar.

6. The truck tractor vehicle of claim 5 comprising a railcar hitch provided on said opposite end of said railcar hitch beam structure for removably engaging the railcar.

7. The truck tractor vehicle of claim 5 comprising a hitch pin provided on said one end of said railcar hitch beam structure for removably attaching said railcar hitch beam structure to said hitch coupler of said truck tractor.

8. The truck tractor vehicle of claim 5 comprising:

(a) a railcar hitch provided on said opposite end of said railcar hitch beam structure for removably engaging the railcar; and (b) a hitch pin provided on said one end of said railcar hitch beam structure for removably attaching said railcar hitch beam structure to said hitch coupler of said truck tractor.

* * * * *